United States Patent
Bhattacharjee

(10) Patent No.: US 12,061,553 B1
(45) Date of Patent: Aug. 13, 2024

(54) MICROSERVICES PREFETCHING USING A MARKOV CHAIN

(71) Applicant: CVS Pharmacy, Inc., Woonsocket, RI (US)

(72) Inventor: Joydeep Bhattacharjee, Allen, TX (US)

(73) Assignee: CVS Pharmacy, Inc., Woonsocket, RI (US)

( * ) Notice: Subject to any disclaimer, the term of this patent is extended or adjusted under 35 U.S.C. 154(b) by 63 days.

(21) Appl. No.: 17/695,034

(22) Filed: Mar. 15, 2022

(51) Int. Cl.
G06F 12/0862 (2016.01)
G06N 20/00 (2019.01)

(52) U.S. Cl.
CPC ......... *G06F 12/0862* (2013.01); *G06N 20/00* (2019.01); *G06F 2212/602* (2013.01)

(58) Field of Classification Search
CPC .......... G06F 12/0862; G06F 2212/602; G06N 20/00
See application file for complete search history.

(56) References Cited

U.S. PATENT DOCUMENTS

| 5,737,751 A * | 4/1998 | Patel ................... G06F 12/0897 711/E12.043 |
| 2019/0243766 A1* | 8/2019 | Doerner .............. G06F 12/0862 |
| 2022/0019530 A1* | 1/2022 | Roberts ............... G06F 12/0862 |

OTHER PUBLICATIONS

Joseph, Doug; "Prefetching using Markov Predictors", ISCA '97 Denver, CO, USA ; 1997 ACM 0-89791-901-7/97/0006 (Year: 1997).*

* cited by examiner

*Primary Examiner* — Gurtej Bansal
(74) *Attorney, Agent, or Firm* — Patent Law Works LLP

(57) ABSTRACT

Systems and methods for microservices prefetching are disclosed. The systems and methods include generating an artificial intelligence model using received user data; prefetching data using the artificial intelligence model, storing the prefetched data in a cache; and using the cache to respond to an information request.

20 Claims, 9 Drawing Sheets

| Action | Next Action | | | | | | |
|---|---|---|---|---|---|---|---|
| | View elibiblity | View Claims | View Overridees | View Accums | View Adjustment | View Plan | Total |
| View elibiblity | 1 | 10 | 2 | 2 | 1 | 4 | 20 |
| View Claims | 1 | 1 | 2 | 3 | 1 | 2 | 10 |
| View Overridees | 2 | 6 | 1 | 2 | 2 | 2 | 15 |
| View Accums | 1 | 4 | 2 | 2 | 6 | 5 | 20 |
| View Adjustment | 2 | 3 | 1 | 6 | 1 | 1 | 14 |
| View Plan | 3 | 2 | 1 | 1 | 1 | 1 | 9 |
| Total | 10 | 26 | 9 | 16 | 12 | 15 | 88 |

Figure 4A

MICROSERVICES PREFETCHING USING A MARKOV CHAIN

FIELD OF THE DISCLOSURE

The present disclosure relates to systems and methods for prefetching data for use in servicing data requests. In particular, the present disclosure relates to using a Markov chain model for microservices prefetching.

BACKGROUND

In a microservices architecture, services are fine-grained and the protocols are lightweight. Many different services are provided independent of others. This loose coupling reduces all types of dependencies and the complexities around it, and provides modularity, scalability and integration. However, service calls over a network have a higher cost in terms of network latency and message processing time than a monolithic system (which builds one coherent service based on the use case). There have been attempts to solve these problems with cache and prefetching using traditional methods. Cache is a hardware or software component that stores data so that future requests for that data can be served faster; the data stored in a cache might be the result of an earlier computation or a copy of data stored elsewhere. The data stored in cache is typically stored based on last usage (aftermath event). Prefetching is a technique for speeding up fetch operations by beginning a fetch operation whose result is expected to be needed soon (time ahead event). Usually this is before it is known to be needed. Using a predefined rule-based prefetching does not always represent the state at runtime, so there is a risk of wasting time by prefetching data that will not be used. However, neither of these attempts have been fully effective in reducing the latency and messaging time for microservices architectures.

Considering the above, there is currently no comprehensive solution for the network latency and message processing time problems of the prior art.

SUMMARY

According to one innovative aspect of the subject matter described in this disclosure, a system comprises one or more processors and a memory, the memory storing instructions, which when executed cause the one or more processors to generate an artificial intelligence model using the received user data, prefetch data using the artificial intelligence model, store the prefetched data in a first cache, and use the first cache to respond to an information request.

In general, another innovative aspect of the subject matter described in this disclosure may be implemented in methods that includes generating, using one or more processors, an artificial intelligence model using received user data, prefetching data using the artificial intelligence model, storing the prefetched data in a first cache, and using the first cache to respond to an information request.

Other implementations of one or more of these aspects include corresponding systems, apparatus, and computer programs, configured to perform the actions of the methods, encoded on computer storage devices.

These and other implementations may each optionally include one or more of the following features. For instance, the operations further include receiving user data including past action and next action information for a requester. In one example, the past action is a request for information from a microservice and the next action is the response to the request. In some instances, the artificial intelligence model is a Markov chain. For example, the operations for generating the artificial intelligence model may comprise determining a set of actions, determining a set of next actions, and modeling the set of actions and the set of next actions as a Markov chain model. In some instances, the operations include determining transitional probabilities for each action to next action in the sets of actions and next actions, and determining a stationary distribution for the transitional probabilities. For example, the generating the artificial intelligence model further comprises adaptively changing the Markov chain model at selective times. In some instances, the operations that may also include storing recency data in a second cache, and using the second cache to respond to the information request.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 4A is a diagram illustrating an example of set of transitions from one action to another and its frequency for use in prefetching in accordance with some implementations.

DETAILED DESCRIPTION

As set forth in detail below, the technology described herein provides an innovative approach to prefetching information to respond to data requests. In particular, the systems and methods described herein advantageously use artificial intelligence and machine learning to proactively prefetch data when a user initiates interaction and use the data that is prefetched to increase the hit rate on the cache and increase the likelihood that the prefetched data will be used. The prefetching can be tuned to only retrieve the next N best actions based on system capacity and compute power.

While the present disclosure will now be described in the context of submitting requests related to actions performed by customer service representative and information provided to the customer service representative, it should be understood that the prefetching system 106 may also be used in a variety of other contexts in which numerous microservice requests need to be serviced in a predefined amount of time, e.g., 200 milliseconds or less. More specifically, the prefetching system 106 will be described in the context of providing client online services for a client application that is used by pharmacy benefit managers.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
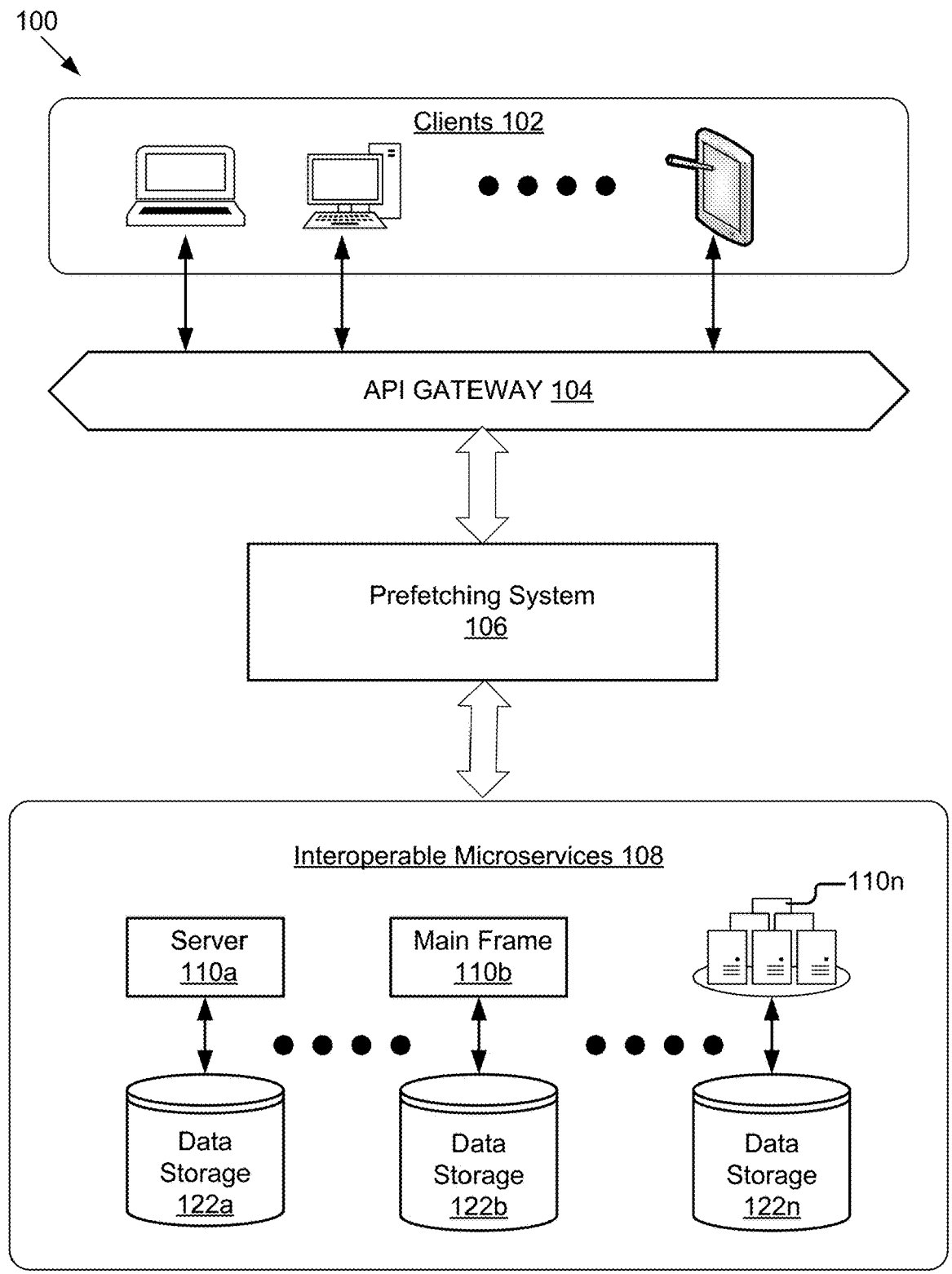
FIG. 1 is a high-level block diagram illustrating a system including a prefetching system in accordance with some implementations.

FIG. 1 is a high-level block diagram illustrating an example system 100 including the prefetching system 106 according to some implementations. The system 100 includes one or more client computing devices 102, an application programming interface (API) gateway 104, a prefetching system 106, and interoperable microservices 108. The one or more client computing devices 102, the API gateway 104, the prefetching system 106, and the interoperable microservices 108 are coupled for communication and cooperation with each other as depicted by the vertical connecting lines in FIG. 1. While a particular arrangement is depicted in FIG. 1 by way of example, it should be noted that other system configurations and architectures are possible including other devices, systems, and networks as well as pluralities of any of the components shown in FIG. 1.

One or more networks may communicatively couple the various components 102, 104, 106 and 108 of the system 100. These networks are represented by the vertical lines connecting the components 102, 104, 106 and 108 of the system 100 in FIG. 1. In some implementations, the network is a wired or wireless network, and may have numerous different configurations. Furthermore, the network may include a local area network (LAN), a wide area network (WAN) (e.g., the internet), and/or other interconnected data paths across which multiple devices may communicate. In some implementations, the network may be a peer-to-peer network. The network may also be coupled with portions of a telecommunications network for sending data using a variety of different communication protocols. In some implementations, the network may include Bluetooth (or Bluetooth low energy) communication networks or a cellular communications network for sending and receiving data including via short messaging service (SMS), multimedia messaging service (MMS), hypertext transfer protocol (HTTP), direct data connection, wireless access point (WAP), email, etc.

The one or more client computing devices 102 include one or more computing devices having data processing and communication capabilities. While the example of FIG. 1 depicts only a three client computing devices 102a and 102n, the system 100 may include any number of client computing devices 102. Although not shown, the computing device 102 may include a web browser and/or other applications. The web browser and/or other applications provide functionality for online client services for pharmacy benefit managers. In some implementations, the web browser of the computing device 102 may also be used to present user interfaces. Each client computing device 102 is coupled to communicate with other components 104, 106, and 108 of the system 100 via a network represented by the signal lines connecting the respective client computing devices 102 to the API gateway 104.

The application programming interface (API) gateway 104 is a server that acts as an API front-end, receives API requests, enforces throttling and security policies, passes requests to the back-end service and then passes the response back to the requester, for example, the client computing devices 102. In some implementations, the API gateway 104 includes a transformation engine that orchestrates and modifies requests and responses on the fly. In some implementations, the API gateway 104 is an API management tool that sits between the client computing devices 102 and the interoperable microservices 108, or in some implementations the prefetching system 106. In some implementations, the API gateway 104 acts as a reverse proxy to accept all application programming interface calls, aggregate the various services required to fulfill them and then return the appropriate results. As shown in FIG. 1, the API gateway 104 is coupled to the client computing devices 102. The API gateway 104 couples the client computing devices 102 to the prefetching system 106 or the interoperable microservices 108.

The prefetching system 106 may be steps, processes, functionalities, software executable by a processor, or a device including routines for prefetching data using artificial intelligence and machine learning responsive to requests received from client computing devices 102 via the API gateway 104. The prefetching system 106 uses artificial intelligence and machine learning to proactively determine the data to store in its cache and what data is prefetched to increase the hit rate on the cache and increase the likelihood that the prefetched data will be used. The prefetching system 106 and its components are described in more detail herein with reference to FIG. 2. The prefetching system 106 is coupled for communication and cooperation with the API gateway 104 and the interoperable microservices 108. The prefetching system 106 and the API gateway 104 cooperate to determine the appropriate routing by the API gateway 104 either directly to the interoperable microservices 108 or to the interoperable microservices through the prefetching system 106.

The interoperable microservices 108 are provided in a microservices architecture. In other words, the architecture structures an application as a collection of services that are highly maintainable and testable, loosely coupled, independently deployed, and organized around business capabilities. In some implementations, the interoperable microservices 108 are provided by a collection of computing devices and associated storage. For example, as shown in FIG. 1, the interoperable microservices 108 may include a server 110a and an associated data storage 122a, a mainframe computer 110b and associated dated storage 122b, and one or more cloud services 110n and associated storage 122n. The server 110a may be coupled to communicate with other components of the system 100 via the network. In some implementations, the server 110a is a hardware server. In other implementations, the server 110a is a combination of a hardware server and the software server. In still other implementations, the server 110a is entirely a software server. The server 110a is coupled for communication with a corresponding data store 122a as depicted. The mainframe 110b may be coupled to communicate with the other components of the system 110a via the network and have a directly coupled data storage 122b. The mainframe 110b is large high-speed computer, especially one supporting numerous workstations or peripherals. The cloud services 110n are on-demand available computing power, without direct active management by the user. The computer system resources and data storage. e.g., cloud storage 122n, are often distributed over multiple locations, each location being a data center. Each of these computing platforms 110a, 110b, and 110n provide one or more services of the overall application. As described above, the interoperable microservices 108 are coupled to the API gateway 104 and to the prefetching system 106. It should be understood that while FIG. 1 only shows one server 110a, one mainframe 110b, and one cloud services 110n, in other implementations the interoperable microservices 108 may include any number of each of these types of computing devices 110a, 110b, and 110n, and associated data storage structures 122a, 122b and 122n.

Figure 2:
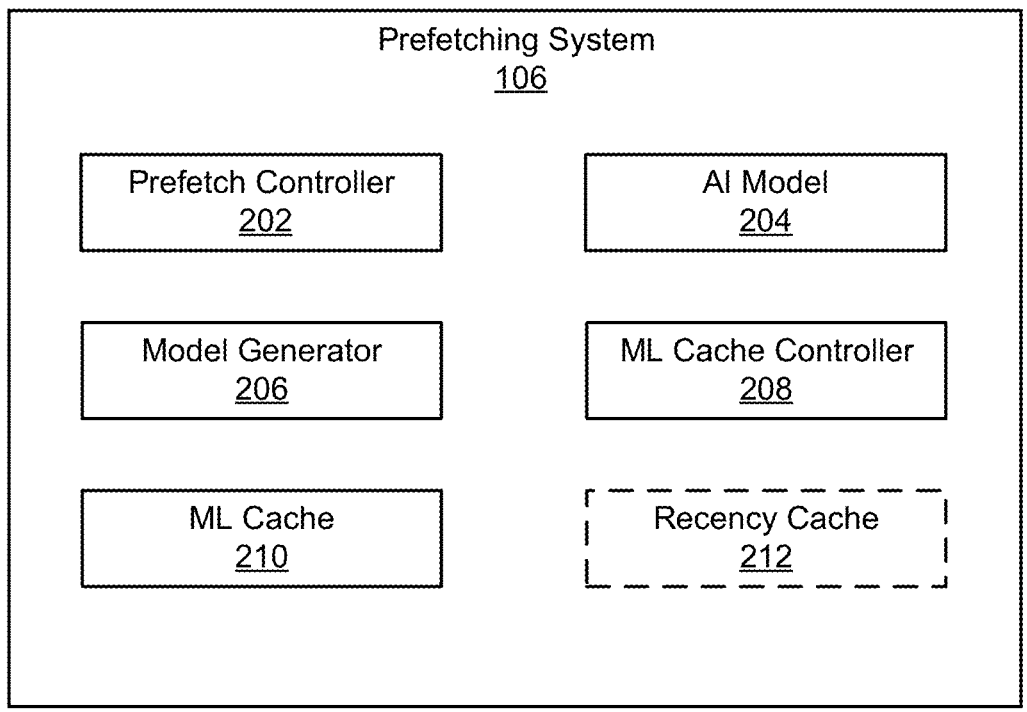
FIG. 2 is a block diagram illustrating a prefetching system in accordance with some implementations.

Referring now to FIG. 2, the prefetching system 106 in accordance with some implementations is described. As shown in FIG. 2, the prefetching system 106 includes a prefetch controller 202, one or more artificial intelligence (AI) models 204, a model generator 206, a machine learning (ML) cache controller 208, a machine learning (ML) cache 210 and a recency cache 212. These components 202, 204, 206, 208, 210, and 212, their configuration, structure and functionality are described in more detail collectively and individually with reference to FIGS. 4A-8. These components 202, 204, 206, 208, 210, and 212 cooperate and communicate with each other as will be described in more detail herein.

The prefetch controller 202 may be steps, processes, functionalities, software executable by a processor, or a device including routines for controlling the operation of the prefetch system 106. The prefetch controller 202 controls the use of the artificial intelligence and machine learning to proactively determine the data to store in the ML cache 210 and the data to prefetch to increase the hit rate on the cache and increase the likelihood that the prefetched data will be used. In some implementations, the prefetch controller 202 cooperates with the ML cache controller 208 to load the ML cache 210. Pre-fetching starts when user initiates a login or uses the system functions. The ML cache controller 208 pre-fetches the next N probable actions based on current state and stores them in the ML cache 210. For example, after logging into a health insurance website, a user may take an action to view medical insurance claims, in which case, the prefetch controller 202 will cooperate with the ML cache controller 208 to pre-fetch the next N actions based on the current state (i.e., viewing medical insurance claims) and store them in the ML cache 210. Pre-fetching is just N step(s) ahead of the user. The prefetching system 106 is responsive to requests received from client computing devices 102 via the API gateway 104. In some implementations, the model generator 206 is coupled to receive information requests from the API gateway 104 and sends responses either from the ML cache 210, the recency cache 212 (if included) or from the interoperable micro-services 108. The prefetch controller 202 is coupled to the other components 204, 206, 208, 210, and 212 of the prefetch system 106 to control them. The operation of the prefetch controller 202 is described in more detail with reference to FIG. 6. In some implementations, the prefetch controller 202 receives and processes information requests from the API gateway 104, responds to the request if the information is stored in either the ML cache 210 or the recency cache 212, or forwards the information request to the interoperable micro-services 108 for processing. The prefetch controller 202 is also coupled to control the model generator 206 for the creation of AI models 204 and the storage of them in the prefetching system 106. The prefetch controller 202 is also coupled to the ML cache controller 208 to configure its operation and the data that will be stored in the ML cache 210. The prefetch controller 202 is also coupled to the recency cache 212 to control whether the recency cache 212 or the ML cache 210 respond to a received information request. In some implementations, the prefetch controller 202 also processes and manages the AI models 204 stored in the prefetching system 106.

The one or more artificial intelligence (AI) models 204 may be steps, processes, functionalities, software executable by a processor, or a device including routines for determining whether a response to a given request should be stored in the ML cache 210. The AI model 204 may include one or more models. Additionally, the AI model 204 in use may change or be adapted over time. In some implementations, the AI model 204 may be modified on an hourly, daily, weekly, monthly, yearly or other selected time interval basis. In still other implementations, the AI model 204 may be modified on demand or when the ML cache 210 has a hit rate below a given threshold. In some implementations, the modification of the AI model 204 on demand may be performed in a separate thread or process. An example of the AI model 204 and its creation will be described in more detail with reference to FIGS. 4A, 4B and 5. In some implementations, there are a plurality of AI models 204, one model for each customer service representative/user that is interacting with the interoperable microservices 108. For example, an AI model 204 may be created prior to user login and then used to prefetch data for that user when the user logs into the system. The AI model 204 may be adapted specifically for the associated customer service representative/user. In this manner, the ML cache 210 can have a portion dedicated to each user that is active on the system. Although the AI model 204 will be described herein as a Markov chain model, it should be understood that the AI model 204 could take other forms including, but not limited to, geometric systems like nearest neighbors and support vector machines, probabilistic systems, evolutionary systems like genetic algorithms, decision trees, neural networks, associated with decision trees, Bayesian inference, random forests, boosting, logistic regression, faceted navigation, query refinement, query expansion, singular value decomposition and the like. The AI models 204 may use supervised learning, semi-supervised learning, or unsupervised learning for building, training and re-training the machine learning systems based on the type of data available and the particular machine learning technology used for implementation. In some implementations, one or more AI models 204 may be used to determine the request and response pairs to be stored in the ML cache 210. In general, training the AI model 204 involves training using data from past requests from customer service agents and the associated action or data responsive to those requests.

The model generator 206 may be steps, processes, functionalities, software executable by a processor, or a device including routines for creating AI models 204 for use by the ML cache controller 208 to determine what information should be retrieved and stored in the ML cache 210. In some implementations, the model generator 206 is coupled to receive information requests from the API gateway 104 and responses from the interoperable micro-services 108 and store them. The stored information can be analyzed and used in the creation of the AI model 204. In some implementations, the user request and response pairs are stored in a time-series fashion. In other implementations, the machine model generator 206 can use requests and responses from historical predetermined amounts of time to generate the AI model 204. For example, the model generator 206 may build the AI model 204 periodically (e.g., daily, weekly, monthly)

as an asynchronous batch process. This AI model 204 uses data from the user navigation history as explained in FIG. 4A. In some implementations, the model generator 206 monitors and stores the requests and responses for later use in generation of the AI model 204. The model generator 206 is also used for replacement or retraining of the AI model 204. As will be described below, the model generator 206 in one example implementation generates a Markov chain for use as the AI model 204. The model generator 206 is coupled to receive one or more request from the API gateway 104, one or more responses from the interoperable micro-services 108, analyze both and build, train or generate an AI model that is stored as AI model 204.

The machine learning (ML) cache controller 208 may also be the steps, processes, functionalities, software executable by a processor, or a device including routines for determining the data to be stored in the ML cache 210. The ML cache controller 208 also uses the AI model 204 to determine the data to be stored in the ML cache 210. In some implementations, the ML cache controller 208 pre-fetches the data when the user logs in and then continues pre-fetching as user navigates the system 106. The pre-fetching retrieves the next N probable actions. For example, the ML cache controller 208 pre-fetches the data and updates the cache after each user request has been responded to. In some implementations, the ML cache controller 208 modifies the data stored in the ML cache 210 on a periodic basis, some other dynamic time interval or predefined times. In other implementations, the ML cache controller 208 modifies the data stored in the ML cache 210 based on modifications to the AI model 204. The ML cache controller 208 is coupled to the AI model 204 and the ML cache 210 to perform these operations.

The machine learning (ML) cache controller 208 may be also be the steps, processes, functionalities, software executable by a processor, or a device including routines for controlling the processing of information requests when the prefetching system 106 includes both an ML cache 210 and a recency cache 212. For example, the recency cache (or second cache) is used to store data after an ML cache miss and system 106 retrieves it from the interoperable microservices. In particular, the ML cache controller 208 can process an incoming request in a variety of different ways. For example, it can serially provide the request first to the ML cache 210 and then if there is a miss in the ML cache 210 then to the recency cache 212 (or vice versa), or it can provide the request in parallel to both the ML cache 210 and the recency cache 212. In some implementations, where the prefetching system 106 does not include a recency cache 212, the ML cache controller 208 is optional. The ML cache controller 208 is coupled to monitor for information requests received by the prefetch controller 202 and control the ML cache 210 and the recency cache 212 in response. The ML cache controller 208 is coupled to receive information requests, and coupled to provide control signals to the ML cache 210 and the recency cache 212.

The machine learning (ML) cache 210 may be steps, processes, functionalities, software executable by a processor, or a device including routines for providing intermediate storage of responses to information requests for faster response. The ML cache 210 is most notably different from traditional caches because the data stored in the ML cache is determined according to the AI model 204. As has been described above, the ML cache controller 208 uses the AI model 204 to determine what data to store in the ML cache 210. The ML cache controller 208 also determines whether an information request will be provided to the ML cache 210 in some implementations the ML cache 210 stores responses based on output of the AI model 204. In response to requests for information, the ML cache 210 determines whether the information for the request is stored in the ML cache 210, and if so, provides the information much faster. If the ML cache 210 does not have the information requested, the request is passed either to the recency cache 212 or the interoperable micro-services 108. The ML cache 210 is coupled to receive control signals from control by the prefetch controller 202, the ML cache controller 208, and to receive and respond to information requests from the API gateway 104.

The recency cache 212 may be steps, processes, functionalities, software executable by a processor, or a device including routines for performing additional cache functions on information requests generated by the API gateway 104 and sent to the interoperable micro-services 108. The recency cache 212 operates under the control of the ML cache controller 208. In some implementations, the recency cache 212 monitors for requests not serviced by either the ML cache 210. The recency cache 212 operates similar to a traditional cache and stores responses to recent past requests not serviced by either the ML cache 210 or the recency cache 212 so that they can be used to respond to future requests faster. The recency cache 212 is shown with dashed lines to indicate that it is optional. It should be understood that in some implementations, the recency cache 212 is unneeded, and the prefetching system 106 can operate solely with the ML cache 210. The recency cache 212 is coupled to receive control signals from control by the prefetch controller 202, the ML cache controller 208, and to receive and respond to information requests from the API gateway 104.

Figure 3:
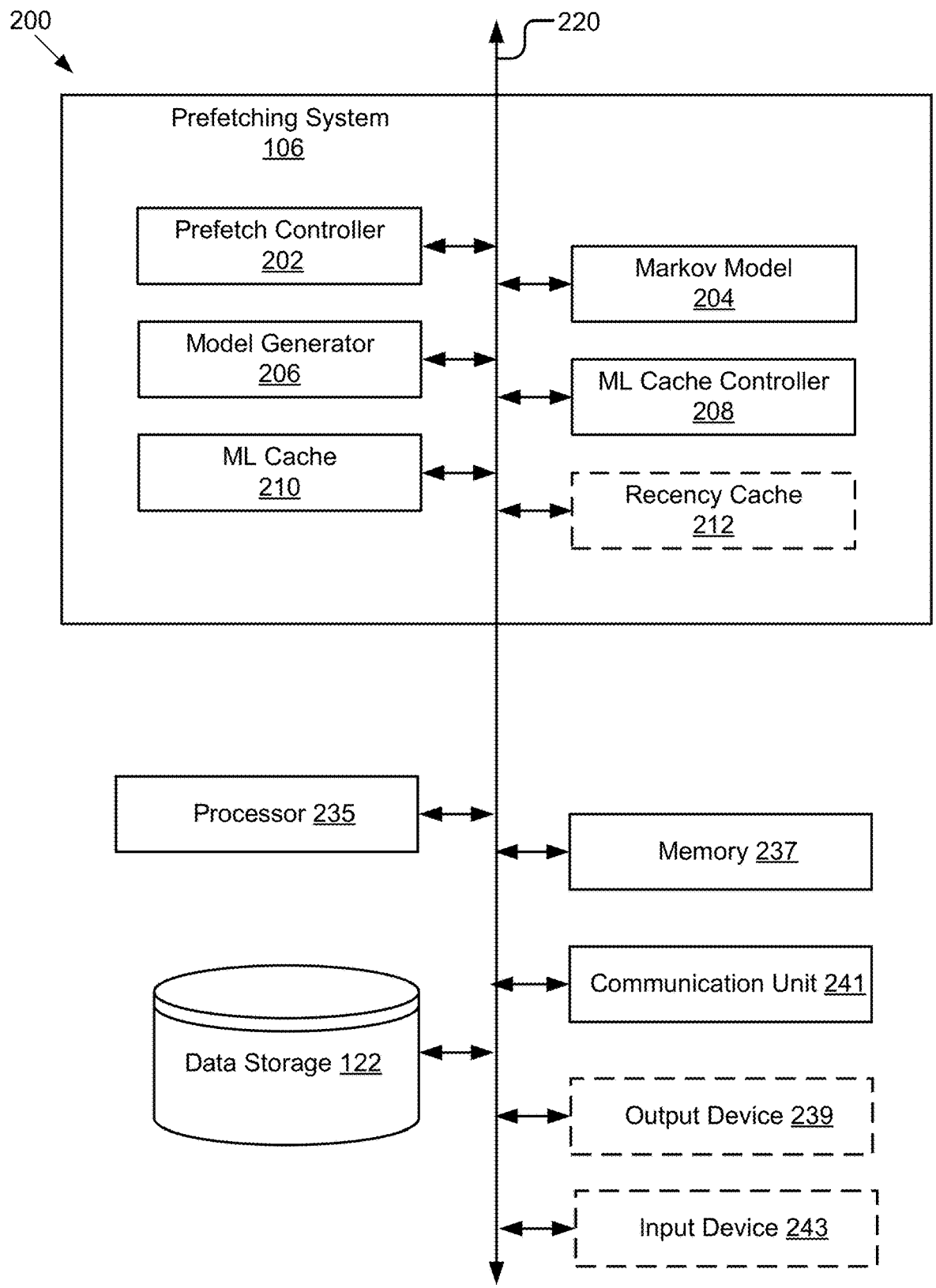
FIG. 3 is a block diagram illustrating a hardware server including the prefetching system in accordance with some implementations.

Referring now to FIG. 3, one example of a server 200 including the prefetching system 106 is shown. In some implementations, the server 200 comprises the prefetching system 106, a processor 235, memory 237, a communication unit 241, the data storage 122, an output device 239, and an input device 243. The prefetching system 106, the processor 235, memory 237, the communication unit 241, the data storage 122, the output device 239, and the input device 243 are communicatively coupled to each other for communication and cooperation by the bus 220. The server 200 depicted in FIG. 3 is provided by way of example and it should be understood that it may take other forms and include additional or fewer components without departing from the scope of the present disclosure. For instance, various components of the server 200 may be coupled for communication using a variety of communication protocols and/or technologies including, for instance, communication buses, software communication mechanisms, computer networks, etc. While not shown, the server 200 may include various operating systems, sensors, additional processors, and other physical configurations. The processor 235, memory 237, communication unit 241, etc., are representative of one or more of these components.

The data storage 122 can include one or more non-transitory computer-readable media for storing the data. In some implementations, the data storage 122 may be incorporated with the memory 237 or may be distinct therefrom. In some implementations, the data storage 122 may be coupled via the cloud or external to the server 200 and coupled via communication unit 241. In some implementations, the data storage 122 may include a database management system (DBMS). For example, the DBMS could include a structured query language (SQL) DBMS, a NoSQL DBMS, various combinations thereof, etc. In some implementations, the DBMS may store data in multi-dimensional tables comprised of rows and columns, and manipulate, e.g., insert, query, update and/or delete, rows of data using programmatic operations. While the data storage 122 is shown in FIGS. 1 and 2 as being part of the server 200, it should be understood that in some implementations the data storage 122 may be directly coupled to the network and not included in the server 200. The server 200 would access the data storage 122 via the network in such an implementation.

The bus 220 can include a communication bus for transferring data between components of the server 200, a network bus system including the network or portions thereof, a processor mesh, a combination thereof, etc. In some implementations, the various components of the server 200 cooperate and communicate via a communication mechanism included in or implemented in association with the bus 220. In some implementations, the bus 220 may be a software communication mechanism including and/or facilitating, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, communication between components of server 200 via bus 220 may be secure (e.g., SSH, HTTPS, etc.).

The processor 235 may execute software instructions by performing various input, logical, and/or mathematical operations. The processor 235 may have various computing architectures to process data signals (e.g., CISC, RISC, etc.). The processor 235 may be physical and/or virtual, and may include a single core or plurality of processing units and/or cores. In some implementations, the processor 235 may be coupled to the memory 237 via the bus 220 to access data and instructions therefrom and store data therein. The bus 220 may couple the processor 235 to the other components of the server 200 including, for example, the prefetching system 106, the communication unit 241, and the output device 239. The processor 235 is also coupled by the communication unit 241 to signal line 106 and the network to retrieve and store information from the other components of the system 100.

The memory 237 may store and provide access to data to the other components of the server 200. The memory 237 may be included in a single computing device or a plurality of computing devices. In some implementations, the memory 237 may store instructions and/or data that may be executed by the processor 235. The memory 237 is also capable of storing other instructions and data, including, for example, an operating system, hardware drivers, other software applications, databases, etc. (not shown). The memory 237 may be coupled to the bus 220 for communication with the processor 235 and the other components of server 200. The memory 237 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 235. In some implementations, the memory 237 may include one or more of volatile memory and non-volatile memory (e.g., RAM, ROM, flash memory, hard disk, optical disk, etc.). It should be understood that the memory 237 may be a single device or may include multiple types of devices and configurations.

The output device 239 may be any device capable of outputting information from the server 200. The output device 239 may include one or more of a display (LCD, OLED, etc.), a printer, a 3D printer, a haptic device, audio reproduction device, touch-screen display, a remote computing device, etc. In some implementations, the output device 239 is a display which may display electronic images and data output by a processor, such as processor 235, of the server 200 for presentation to a user. The output device 239 is shown with dashed lines in FIG. 2 to indicated that it is optional.

The communication unit 241 may include one or more interface devices (I/F) for wired and/or wireless connectivity among the components of the server 200 and the network. For instance, the communication unit 241 may include, but is not limited to, various types of known connectivity and interface options. The communication unit 241 may be coupled to the other components of the server 200 via the bus 220. The communication unit 241 can provide other connections to the network via signal line 106 and to other systems, devices and databases of the system 100 using various standard communication protocols.

The input device 243 may include any device for inputting information into the server 200. In some implementations, the input device 243 may include one or more peripheral devices. For example, the input device 243 may include a keyboard, a pointing device, microphone, an image/video capture device (e.g., camera), a touch-screen display integrated with the output device 239, etc. The input device 243 is shown with dashed lines in FIG. 2 to indicated that it is optional.

In some implementations, the prefetch controller 202, the one or more AI models 204, the model generator 206, the ML cache controller 208, the ML cache and the recency cache 212 are sets of instructions stored in the memory 237 executable by the processor 235 to provide their respective acts and/or functionality. In any of these implementations, the prefetch controller 202, the one or more AI models 204, the model generator 206, the ML cache controller 208, the ML cache and the recency cache 212 may be adapted for cooperation and communication with each other, the processor 235 and other components of the server 200 by the bus 220. The components 202, 204, 206, 208, 210, and 212 of the prefetching system 106 are also coupled to the network via the communication unit 241 for communication and interaction with the other systems, devices and databases of the system 100. The structure, configuration, and functionality of the prefetch controller 202, the one or more AI models 204, the model generator 206, the ML cache controller 208, the ML cache and the recency cache 212 has been described in FIG. 2, and has a similar functionality here in FIG. 3 as has been described.

As was described, the model generator 206 creates one or more AI models 204, then the ML cache controller 208 uses the AI models 204 to determine what information to prefetch and store in the ML cache 210. In some implementations, the AI model 204 may be a Markov chain model. Markov chains are set of transitions which are defined by the probability distribution amongst each other. The element i, j is the probability of transitioning from state i to j. Markov demonstrated that over a long run the probability of moving to a particular state will converge to a single steady state value. In other words, if we know the present state, we do not need any past information to predict the future state. The AI models 204 of the present disclosure apply this concept to pre-fetch domain data for a user based on actions performed in the past using the machine learning techniques described below. This can speed up the retrieval process of the service layer since the backend calls are costly and slow and impacts business.

Each user (or customer service representative) performs a pattern of actions throughout what they do. The model generator 206 collects data of the user behavior and accurately predicts the next action. Using the next action, the information associated with the next action can be retrieved and stored in the ML cache 210. The present disclosure advantageously uses a Markov like probability technique because of its predictive power. In some implementations, where it is desirable to have context-dependent content to determine the cache content, other types of artificial intelligence models such as neural networks or long short-term memory (LSTM) or a recurrent neural network (RNN) can be used in place of the Markov chain model. For those use cases, LSTM or Attention based Neural Networks may be more desirable, e.g., for next word prediction. However, the use of Markov chain models is particularly advantageous because all states are observable, and probabilities converge over time.

Referring now to FIG. 4A, the operation of the present disclosure will now be described in the context of an example online services for a pharmacy benefit manager (PBM) client application. More specifically, a user (in this case, a customer service representative) may be using a client 102 to send requests for action or information to the interoperable micro-services 108 that provide pharmacy benefits information. The client online services PBM client application may have over hundreds or thousands of different fetch operations. User behavior for some of these operation or actions are listed below. The more data the model generator 206 collects and analyzes, the better the model will be in predicting the next action. In some implementations, the model generator 206 collects user information from a single past session. In other implementations, the model generator 206 collects user information from a plurality of past sessions with increasing accuracy being derived from the more past sessions and data the model generator 206 is able to analyze and process. As noted above, in some implementations each Markov chain model is specific to an individual user. However, in some implementations, data from multiple users or groups of users with similar roles may be combined using a clustering technique and analyzed to produce the Markov chain model. To illustrate the operation of the present disclosure, an example with six possible actions is shown in the table of FIG. 4A. FIG. 4A shows an example table 400 of current actions and next actions for use by the prefetching system 106 in accordance with some implementations. It should be understood that the number of actions shown in the table of FIG. 4A is merely one example and that it is greatly simplified to illustrate the principles of the present disclosure. In other implementations, there may be hundreds or thousands of actions for which the Markov chain model is determined using the principles will be described herein. For this specific example, there are six (6) states including: 1) view eligibility; 2) view claims; 3) view overrides; 4) view accumulations; 5) view adjustment; and 6) view plan. These are six example actions that a customer service representative may take to extract and review data from the interoperable micro-services 108 that in turn can be presented to a member or customer with whom which the customer service representative is interacting. For the example table shown in FIG. 4A, we assume that the model generator 206 has reviewed the past 88 actions (see cell 406) as illustrated in cell 406 of the table. In reviewing the actions in the table of FIG. 4A, in 10 (see cell 402) out of 20 (see cell 404) the user transitioned from the "View Eligibility" action to the "View Claims" next action. It also shows that out of a total of 26 transitions (cell 408) to the next action of "View Claims, 10 of them (see cell 402) were from the action of "View Eligibility." Each of the cells in a given row show the total the number of times in the past data where the action in the current row transitioned to the next action in the column of the row totals column. The model generator 206 considers each action as a state in the Markov chain.

Figure 4B:
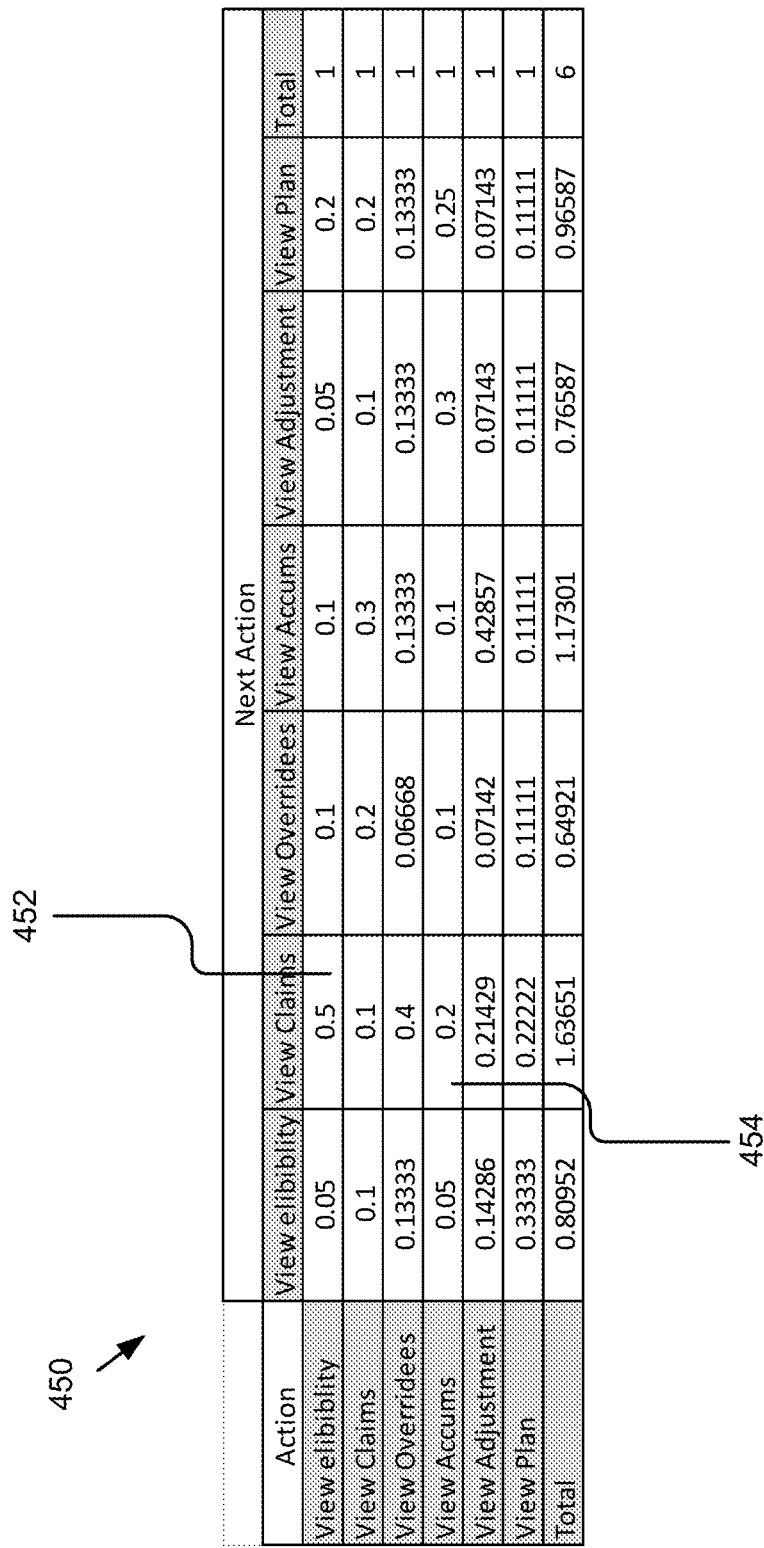
FIG. 4B is a diagram illustrating an example of first order transition matrix for use in prefetching in accordance with some implementations.

Referring now also to FIG. 4B, an example transition matrix 450 for use in prefetching in accordance with some implementations is shown. The transition matrix 450 of FIG. 4B represents the transition probabilities (first power) derived from the data in the table of FIG. 4A. The model generator 206 considers each action as state in the Markov chain 500, and encodes the dependency between states using conditional probabilities called transition probabilities in Markov models. FIG. 4B shows how the data of FIG. 4A is converted into transition matrix 450 of FIG. 4B with the corresponding conditional probabilities in each cell. For example, the 10 (see cell 402) out of 20 (see cell 404) where the user transitioned from the "View Eligibility" action to the "View Claims" next action in FIG. 4A gets converted to the conditional probability of 0.5 of 50% (see cell 452) in the transition matrix 450 of FIG. 4B. Similarly, the data from the cells in FIG. 4A can be converted to conditional probabilities shown in the table in FIG. 4B. So, the likelihood of viewing claims given a user just finished looking into accumulation is 20% (see cell 454) with starting state as accumulation and ending state as viewing claims. It should be understood that FIG. 4B only illustrates the transitional probabilities of the first power and that additional higher powers of the transitional probabilities can be calculated until the transitional probabilities converge to a steady-state.

Figure 5:
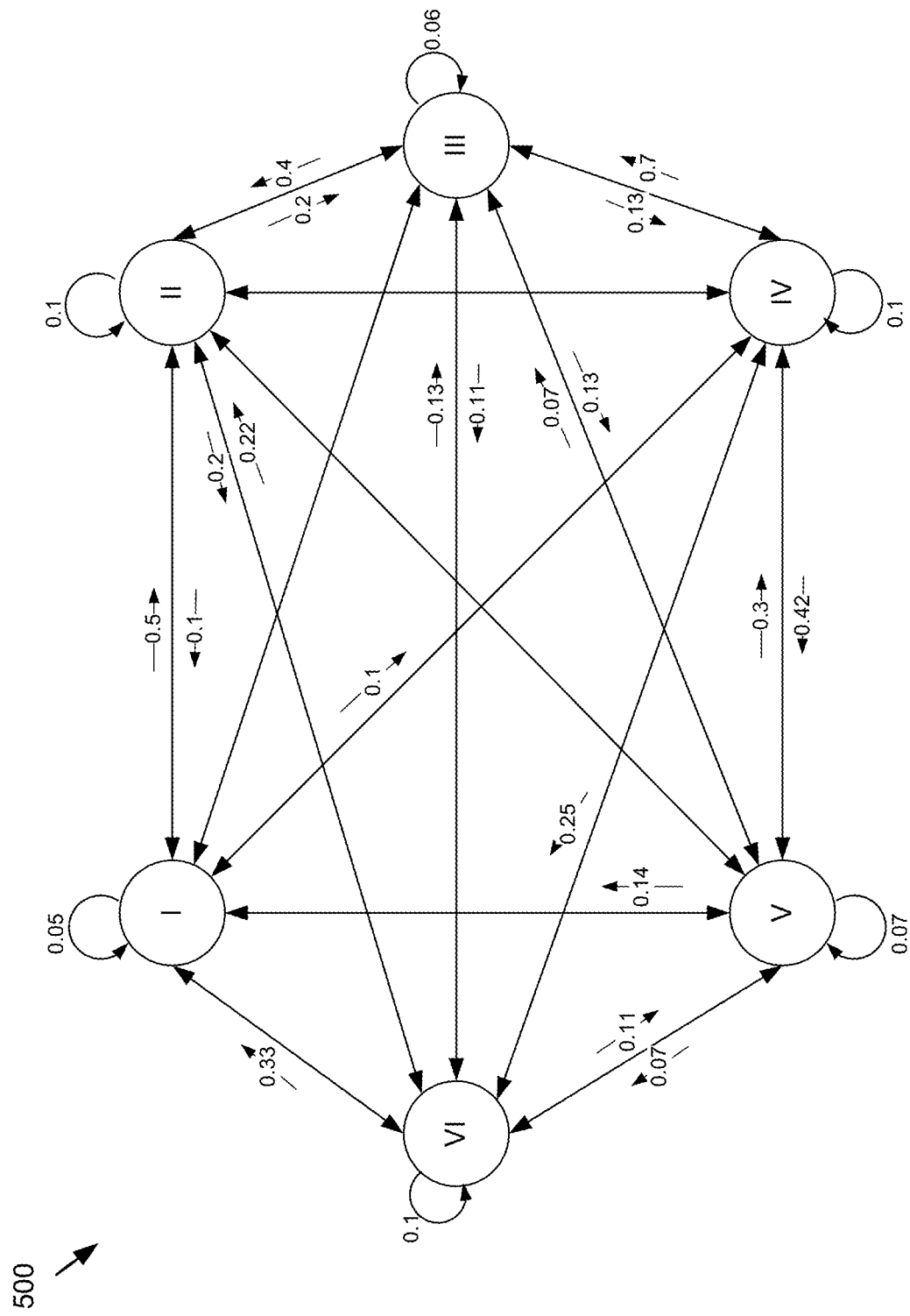
FIG. 5 is a diagram showing an example Markov chain corresponding to the first order transition matrix of FIG. 4B in accordance with some implementations.

Once the conditional probabilities have been determined, model generator 206 can generate a Markov chain graph 500 as shown in FIG. 5. FIG. 5 shows a state diagram of the Markov chain graph 500 corresponding to the conditional probabilities of FIG. 4B. In this example Markov chain graph 500, there are a total of six states. State I is view eligibility. State II is view claims. State III is view overrides. State IV is view accumulations. State V is view adjustment, and State VI is view plan. The Markov chain graph of FIG. 5 shows the transitional probability of transitioning from one state to another in the graph 500. Using the Markov chain graph 500 the system 106 can predict the probability of the user starting at "view eligibility" state (state I) and ending in "viewing claims" (State II) after viewing something else. The Markov chain graph 500 of FIG. 5 shows the (i) Starting state (ii) End State and (iii) timeframe. In FIG. 5, the timeframe is two steps, and the states have been defined above. In some implementations, problems can be solved using Conditional Probabilities. For example, various paths are shown below:

1. Start with "view eligibility", do another "view eligibility" and then "view claims". P("view eligibility"|"view eligibility")*P("view claims"|"view eligibility")=0.05*0.5=0.025
2. Start with "view eligibility", do "view claims" and then another "view claims". P("view claims"|"view eligibility")*P("view claims"|"view claims")=0.5*0.1=0.05
3. Start with "view eligibility", do "view overrides" and then "view claims". P("view overrides"|"view eligibility")*P("view claims"|"view overrides")=0.1*0.4=0.04
4. Start with "view eligibility", do "view accumulations" and then "view claims". P("view accumulation"|"view eligibility")*P("view claims"|"view accumulation")=0.1*0.2=0.02

5. Start with "view eligibility", do "view adjustments" and then "view claims". P("view adjustments"| "view eligibility")*P("view claims"|"view adjustment")=0.05*0.21=0.01
6. Start with "view eligibility", do "plan summary" and then "view claims". P("plan summary"| "view eligibility")*P("view claims"|"plan summary")=0.2*0.22=0.044

Hence the probability of someone starting with "view eligibility" and ending in "viewing claims" in 2 steps is (0.025+0.05+0.04+0.02+0.01+0.044)=0.19. We can extend this to all other actions and steps and the resulting probabilities can be stored using a 6×6 matrix and this is called the second power of transition matrix. Using the same technique, the model generator 206 builds the $3^{rd}$ power, $4^{th}$ power, $5^{th}$ power, and so on until it converges to steady state. This is done by iteration. Therefore, the ML cache is particularly advantageous because it only requires the current state to predict accurately the next state. Using this Markov chain graph 500, the prefetching system 106 can prefetch the data efficiently with higher cache hit probability.

In some implementations, rather than having to do the iterative calculations, the model generator 206 can generate the Markov chain graph 500 using linear algebra and performing matrix decomposition. To find the stable solution or stationary distribution, the model generator 206 finds the Eigenvectors for eigenvalue of 1 (1=1) using linear algebra such that: $Av=\lambda v =>$ where A=Transition Square Matrix and v=eigenvectors (stable solution) and 1=1. The above transition matrix of FIG. 4B can be reduced to row echelon form and solved for eigen vector.

Figure 6:
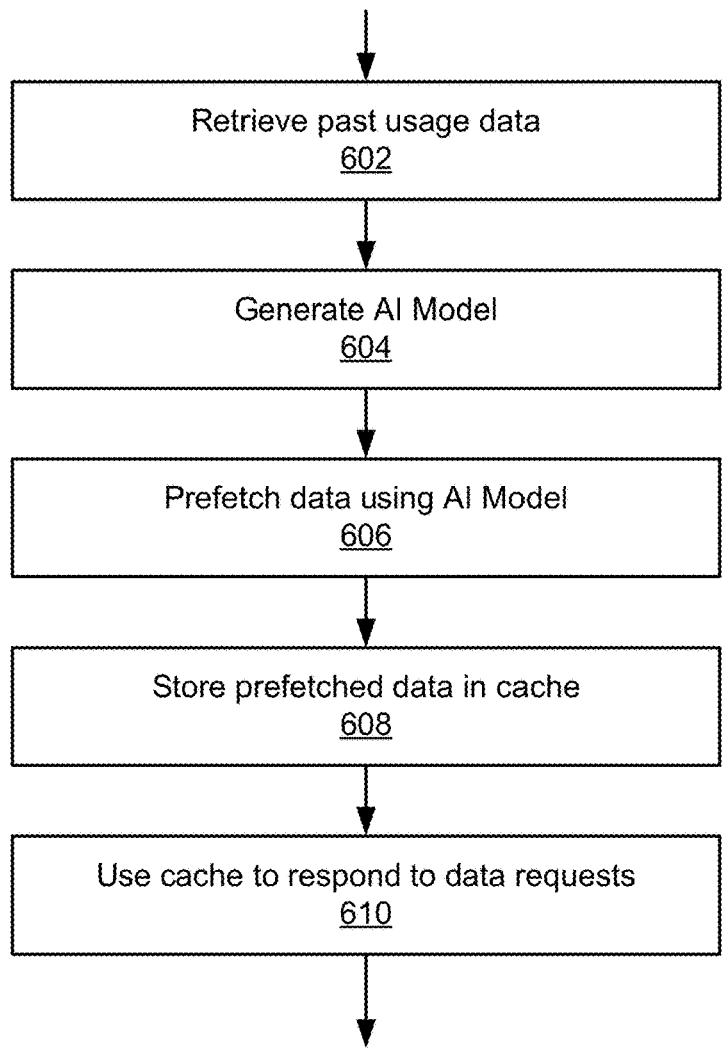
FIG. 6 is a flow diagram showing a method for prefetching in accordance with some implementations.

Referring now to FIG. 6, a method 600 for prefetching in accordance with some implementations of the present disclosure will now be described. The method 600 begins by retrieving 602 past usage data. The past usage data may include requests for information received by the API gateway 104 and corresponding responses from the interoperable micro-services 108 to those requests. More specifically, the request may be for microservices and the responses may be the information provided by those microservices. Next, the method 600 generates 604 an AI model 204. An example AI model 204 is a Markov chain as has been described herein. The method 600 continues by prefetching data using the AI model 204. The method 600 then stores 608 the prefetched data into the cache, e.g., the ML cache 210. Once the cache has been loaded, the method 600 uses 610 the cache to respond to data requests presented from the API gateway 104. For example, the API gateway 104 provides the request to the prefetching system 106, and the ML cache 210 of the prefetching system 106 determines whether the information corresponding to the request is stored in the ML cache 210. If so, the ML cache 210 provides the information to the requester. If not, the ML cache 210 passes the request on to the interoperable micro-services 108.

Figure 7:
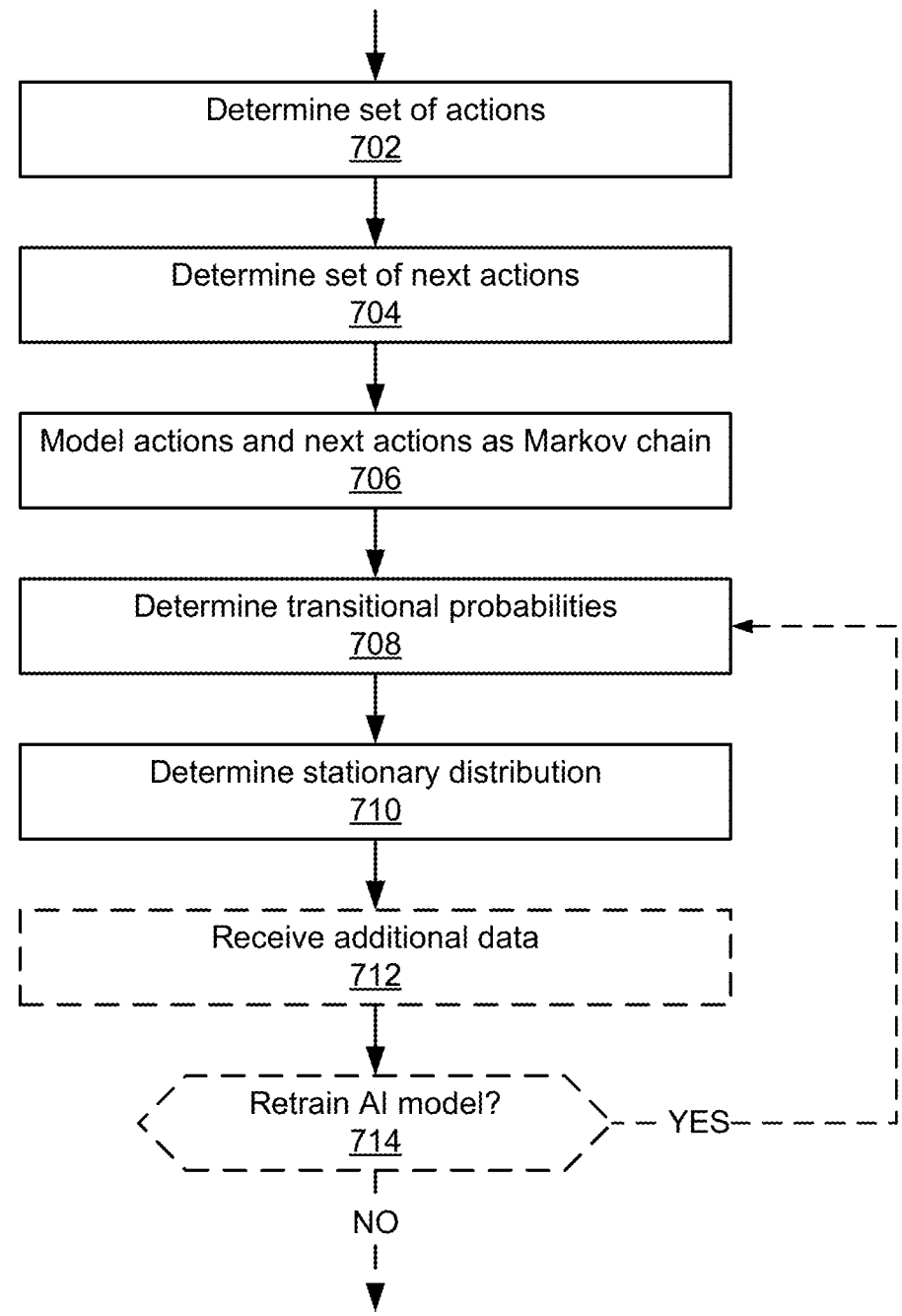
FIG. 7 is a flow diagram showing a method for generating an artificial intelligence model in accordance with some implementations.

Referring now to FIG. 7, a method 604 for generating an artificial intelligence model 204 in accordance with some implementations is described. The method 700 begins by determining 702 a set of actions. For example, the actions may be requests for particular information. Next, the method 700 determines 704 a set of next actions. The next actions are possible actions that may occur in response to the actions. In some instances, the next actions may be the information that is provided in response to a request. The method 700 continues by modeling 706 the actions and the next actions as a Markov chain. Once the model has been generated, the method 700 determines 708 transitional probabilities for each of the actions to a next action. Next, the method 700 determines 710 a stationary distribution for the transitional probabilities. In some implementations, a stationary distribution for the transitional probabilities is determined by calculating the transitional matrix interim through the first, second, third, fourth power, etc. and until the matrix converges to a steady-state. In some implementations, the stationary distribution for the transitional probabilities can be determined by calculating the eigenvectors for eigenvalue of 1 using linear algebra. Once the stationary distribution of the probabilities in the Markov chain model are determined, they can be used to prefetch data and store in the ML cache 210. In some implementations, the Markov model may be updated adaptively at different time intervals such as hourly, daily, weekly, monthly, etc. The process for adaptively changing the Markov model includes the method 700 retrieving 712 additional data. For example, a new set of information requests and information responses may be used to update the Markov chain model. In block 712, the method receives or retrieves that additional data. Next, the method 700 determines 714 whether the AI model should be retrained. In some implementations, the AI model is retrained when there are cache misses exceeding a predetermined threshold for the user. In some implementations, the AI model is retrained on a periodic basis. In still other implementations, the AI model is retrained after some period of time determined using an AI algorithm, for example a time-series sequence modeling. If the method 700 determines that the AI model needs to be retrained, the method 700 loops to block 708 to determine modified values for the transitional probabilities. Then the method 700 determines 710 a new stationary distribution based on the received additional data (from block 712) and the revised transitional probabilities. If the method 700 determines that the AI model does not need to be retrained, the method continues using the existing AI model. As shown in FIG. 7, the process of dynamically adapting the Markov chain model is optional so process steps 712 and 714 are shown with dashed lines.

Figure 8:
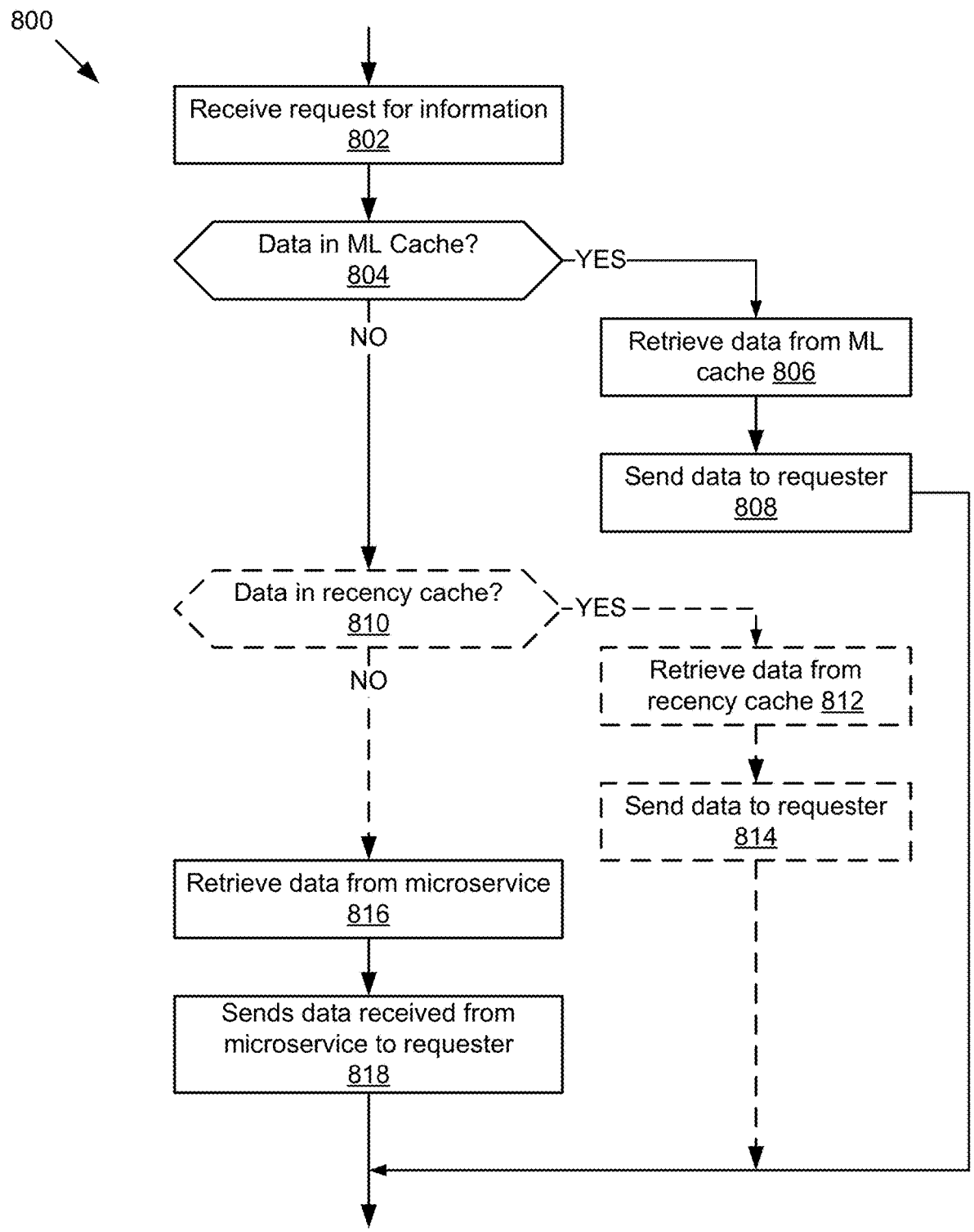
FIG. 8 is a flow diagram showing a method for processing a microservice request in accordance with some implementations.

Referring now to FIG. 8, a method 800 for processing a microservice request in accordance with some implementations is shown. FIG. 8 illustrates that the prefetching system 106 of the present disclosure is particularly advantageous. In particular, the prefetching system 106 may include both an ML cache 210 and a recency cache 212 to more quickly respond to information requests from the API gateway 104. This is particularly advantageous because the prefetching system 106 is able to respond to requests from the API gateway 104 in 200 milliseconds or less. This is particularly advantageous where the interoperable microservices 108 include an architecture that is not monolithic and includes older legacy systems. The method 800 begins by receiving 802 a request for information. More specifically, this may be a request for an microservice or information provided by microservice. This may be a request received by the ML cache controller 208 from the API gateway 104. The ML cache controller 208 sends the request to the ML cache 210. Next the method 800 determines 804 whether the requested data is stored in the ML cache 210. If not, the method 800 proceeds to block 810. On the other hand, if the method 800 determines that the requested data is stored in the ML cache 210, the method 800 proceeds to block 806. In block 806, the method 800 retrieves 806 the requested data from the ML cache 210, and sends 808 the data to the requester. After step 808, the method 800 has processed this matter service request.

If the method 800 determined in block 804 that the data was not stored in the ML cache 210, the method 800 then determines 810 whether the data is stored in the recency cache 212. If the data is determined not stored in the recency cache 212, the method 800 proceeds to block 816 as will be described below. However, if the data is determined to be in the recency cache 212, the method 800 proceeds to retrieve 812 the data from the recency cache 212, and sends 814 the data to the requester. As noted above, the recency cache 212 may optionally be included in the prefetching system 106. Thus, blocks 810, 812, and 814 are shown with dashed lines to indicate that they are optional in the method 800 in some implementations.

If the method 800 determined in block 810 that the data was not stored in the recency cache 212, that indicates that the data is not stored in either the ML cache 210 or the recency cache 212. In this case, the method 800 retrieves 816 the data from the microservice, and sends 818 the data received from the microservice to the requester. After block 808, 814 or 818, processing of the request is complete.

It should be understood that the process steps of the method 800 may be performed in different orders. For example, the method 800 may perform steps 810, 812 and 814 before steps 804, 806 and 808 in some implementations. In other implementations, steps 810, 812, and 814 may be performed in parallel with steps 804, 806, and 808. For example, after step 802, an alternative implementation of the method may proceed to both step 804 and 810 in parallel. In such a case, the transition from step 804-4808 in the case to that the data is not stored in either cache respectively would be to step 816.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and operations on data within a computer memory. An algorithm is here, and generally, conceived to be a self-consistent set of operations leading to a desired result.

To facilitate description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The technology described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

The structure, algorithms, and/or interfaces presented herein are not inherently related to any particular computer or other apparatus. Various general-purpose systems may be used with programs in accordance with the teachings herein, or it may prove convenient to construct more specialized apparatus to perform the described methods. The structure for a variety of these systems will be apparent from the description above. In addition, the techniques introduced herein are not described with reference to any particular programming language. It will be appreciated that a variety of programming languages may be used to implement the techniques as described herein.

The foregoing description has been presented for the purposes of illustration and description. It is not intended to be exhaustive or to limit the techniques to the precise form disclosed. Many modifications and variations are possible in light of the above teaching. As will be understood by those familiar with the art, the techniques may be implemented in other specific forms without departing from the spirit or essential characteristics thereof. Likewise, the particular naming and division of the modules, routines, features, attributes, methodologies and other aspects are not mandatory or significant, and the mechanisms that implement the techniques or its features may have different names, divisions and/or formats.

What is claimed is:

1. A method comprising:
   determining, using one or more processors, a set of actions corresponding to a plurality of microservices, wherein:
   each action in the set of actions comprises a user request; and
   each microservice of the plurality of microservices comprises a service call over a network for data used by that microservice to respond to a corresponding user request and return a corresponding user response;

generating, using the one or more processors, an artificial intelligence model by:
   retrieving a time-series of user request and user response pairs for the plurality of microservices from past usage data for at least one user; and
   training the artificial intelligence model using the time-series and the set of actions to determine transitional probabilities among the plurality of microservices;
prefetching, responsive to a prior microservice and based on the artificial intelligence model, data corresponding to a predicted next action among the plurality of microservices by sending a corresponding service call over the network for the predicted next action;
storing the prefetched data in a first cache; and
using the first cache to respond to an information request corresponding to the predicted next action.

2. The method of claim 1, wherein:
generating the artificial intelligence model further comprises determining a user from a plurality of users; and
the past usage data comprises the time-series of user request and user response pairs for a prior session of the user using the set of actions and corresponding plurality of microservices.

3. The method of claim 2, further comprising:
selecting the artificial intelligence model used from a plurality of artificial intelligence models trained for the plurality of users, wherein the artificial intelligence model is specific to the user.

4. The method of claim 1, wherein the artificial intelligence model is a Markov chain.

5. The method of claim 1, wherein generating the artificial intelligence model comprises:
determining a set of next actions; and
modeling the set of actions and the set of next actions as a Markov chain model.

6. The method of claim 5, wherein the generating the artificial intelligence model further comprises:
determining transitional probabilities for each action to next action in the sets of actions and next actions; and
determining a stationary distribution for the transitional probabilities.

7. The method of claim 5, wherein the generating the artificial intelligence model further comprises adaptively changing the Markov chain model at selective times.

8. The method of claim 1, further comprising:
storing recency data in a second cache; and
using the second cache to respond to the information request.

9. A system comprising:
one or more processors; and
a memory, the memory storing instructions, which when executed cause the one or more processors to:
   determine a set of actions corresponding to a plurality of microservices, wherein:
      each action in the set of actions comprises a user request; and
      each microservice of the plurality of microservices comprises a service call over a network for data used by that microservice to respond to a corresponding user request and return a corresponding user response;
   generate an artificial intelligence model by:
      retrieving a time-series of user request and user response pairs for the plurality of microservices from past usage data for at least one user; and
      training the artificial intelligence model using the time-series and the set of actions to determine transitional probabilities among the plurality of microservices;
   prefetch, responsive to a prior microservice and based on the artificial intelligence model, data corresponding to a predicted next action among the plurality of microservices by sending a corresponding service call over the network for the predicted next action;
   store the prefetched data in a first cache; and
   use the first cache to respond to an information request corresponding to the predicted next action.

10. The system of claim 9, wherein:
generating the artificial intelligence model further comprises determining a user from a plurality of users; and
the past usage data comprises the time-series of user request and user response pairs for a prior session of the user using the set of actions and corresponding plurality of microservices.

11. The system of claim 10, wherein:
the memory also stores instructions, which when executed cause the one or more processors to select the artificial intelligence model used from a plurality of artificial intelligence models trained for the plurality of users; and
the artificial intelligence model is specific to the user.

12. The system of claim 9, wherein the artificial intelligence model is a Markov chain.

13. The system of claim 9, wherein to generate the artificial intelligence model further causes the one or more processors to:
determine a set of next actions; and
model the set of actions and the set of next actions as a Markov chain model.

14. The system of claim 13, wherein to generate the artificial intelligence model further causes the one or more processors to:
determine transitional probabilities for each action to next action in the sets of actions and next actions; and
determine a stationary distribution for the transitional probabilities.

15. The system of claim 13, wherein to generate the artificial intelligence model further causes the one or more processors to adaptively changing the Markov chain model at selective times.

16. The system of claim 9, wherein the memory also stores instructions, which when executed cause the one or more processors to:
store recency data in a second cache; and
use the second cache to respond to the information request.

17. A system comprising:
a machine learning cache configured to store responses to requests;
an artificial intelligence model configured to determine whether a user response to a given user request should be stored in the machine learning cache before the give user request is received, wherein:
   the artificial intelligence model determines transitional probabilities among a plurality of microservices corresponding to a set of actions;
   each action in the set of actions comprises a user request;
   each microservice of the plurality of microservices comprises a service call over a network for data used by that microservice to respond to a corresponding user request and return a corresponding user response; and the artificial intelligence model is trained using a time-series of user request and user response pairs for the plurality of microservices from past usage data for at least one user to determine the transitional probabilities among the plurality of microservices; and a machine learning cache controller configured to prefetch, responsive to a prior microservice and using the artificial intelligence model, data to be stored in the machine learning cache for a predicted next action by sending a corresponding service call over the network for the predicted next action, wherein the machine learning cache controller is coupled for communication with the artificial intelligence model and the machine learning cache.

18. The system of claim 17 wherein the artificial intelligence model is a Markov chain model.

19. The system of claim 17 further comprising:
a model generator configured to:
  determine the set of actions corresponding to the plurality of microservices;
  retrieve historical user requests and corresponding user responses corresponding to the set of actions and a set of next actions;
  order the historical user requests and corresponding user responses in time order as a time-series of user request and user response pairs;
  create the artificial intelligence model by determining, based on the time-series of user request and user response pairs:
    transitional probabilities for each action to next action in the sets of actions and next actions; and
    a stationary distribution for the transitional probabilities; and
  provide the artificial intelligence model to the machine learning cache controller.

20. The system of claim 17 further comprising:
a prefetch controller configured to receive and respond to user requests, wherein the prefetch controller is:
  coupled to receive a user request from an application programming interface gateway;
  coupled to the machine learning cache to retrieve corresponding user responses from the machine learning cache;
  configured to respond to the user request by:
    retrieving data from the machine learning cache and providing it if the corresponding user response was stored in the machine learning cache prior to receiving the user request; and
    retrieving data from an interoperable microservice if the corresponding user response is not stored in the machine learning cache.

\* \* \* \* \*